(12) United States Patent
Huke et al.

(10) Patent No.: US 12,505,498 B2
(45) Date of Patent: Dec. 23, 2025

(54) METHOD OF DISPLAYING A NOTIFICATION FROM A BETTING APPLICATION USING AI THAT CAN IMPACT NORMAL BETTING

(71) Applicant: AdrenalineIP, Washington, DC (US)

(72) Inventors: Casey Alexander Huke, Washington, DC (US); John Cronin, Jericho, VT (US); Joseph W. Beyers, Saratoga, CA (US); Harrison Grant, Anaheim, CA (US)

(73) Assignee: AdrenalineIP, Washington, DC (US)

( * ) Notice: Subject to any disclaimer, the term of this patent is extended or adjusted under 35 U.S.C. 154(b) by 0 days.

(21) Appl. No.: 17/688,057

(22) Filed: Mar. 7, 2022

(65) Prior Publication Data

US 2022/0188959 A1 Jun. 16, 2022

Related U.S. Application Data

(62) Division of application No. 17/101,167, filed on Nov. 23, 2020, now Pat. No. 11,270,399.

(60) Provisional application No. 63/110,025, filed on Nov. 5, 2020.

(51) Int. Cl.
*G06Q 50/34* (2012.01)
*G07F 17/32* (2006.01)

(52) U.S. Cl.
CPC ........... *G06Q 50/34* (2013.01); *G07F 17/323* (2013.01); *G07F 17/3244* (2013.01); *G07F 17/3288* (2013.01)

(58) Field of Classification Search
CPC ... G06Q 50/34; G07F 17/323; G07F 17/3244; G07F 17/3288
See application file for complete search history.

(56) References Cited

U.S. PATENT DOCUMENTS

| | | | |
|---|---|---|---|
| 7,648,414 B2 | 1/2010 | Mcnutt et al. | |
| 9,076,305 B2 | 7/2015 | Amaitis et al. | |
| 9,092,940 B2 | 7/2015 | Fine et al. | |
| 2006/0094506 A1* | 5/2006 | Tarter | G06Q 10/00 463/42 |
| 2007/0072679 A1* | 3/2007 | Kerns | A63F 13/12 463/42 |
| 2010/0160012 A1* | 6/2010 | Amaitis | G07F 17/3244 463/2 |
| 2011/0177862 A1* | 7/2011 | Amaitis | G07F 17/326 463/25 |
| 2012/0058813 A1* | 3/2012 | Amaitis | G07F 17/3269 463/25 |
| 2012/0264503 A1* | 10/2012 | Lisenbee | G07F 17/326 463/25 |

(Continued)

OTHER PUBLICATIONS

Notification of Transmittal of the International Search Report and the Written Opinion issued on Mar. 1, 2022 in corresponding International Application No. PCT/US2021/058227; 11 pages.

*Primary Examiner* — Steve Rowland
(74) *Attorney, Agent, or Firm* — Maier & Maier, PLLC

(57) ABSTRACT

A system for wagering on outcomes of a live sporting event. The system includes an artificial intelligence-based process which will notify users when wagers that would be of interest to them are available. These notifications could be used to drive users to wagers where there is an imbalance wagers in order to reduce risk for the offeror of the wager.

3 Claims, 3 Drawing Sheets

Content - High Level Diagram

(56) References Cited

U.S. PATENT DOCUMENTS

| | | |
|---|---|---|
| 2013/0178270 A1* | 7/2013 | Flaherty ................ A63F 13/47 |
| | | 463/16 |
| 2014/0087837 A1 | 3/2014 | Asher et al. |
| 2014/0094274 A1 | 4/2014 | Guinn et al. |
| 2017/0232351 A1 | 8/2017 | Thompson |
| 2017/0243438 A1* | 8/2017 | Merati ................ G07F 17/3244 |
| 2017/0358173 A1 | 12/2017 | Mccafferty |
| 2019/0051117 A1* | 2/2019 | Acres ................ G07F 17/3286 |
| 2019/0392684 A1* | 12/2019 | McDonald ............ G06N 3/044 |
| 2020/0193770 A1 | 6/2020 | Amaitis et al. |
| 2020/0302745 A1* | 9/2020 | Merati ................ G07F 17/3227 |

* cited by examiner

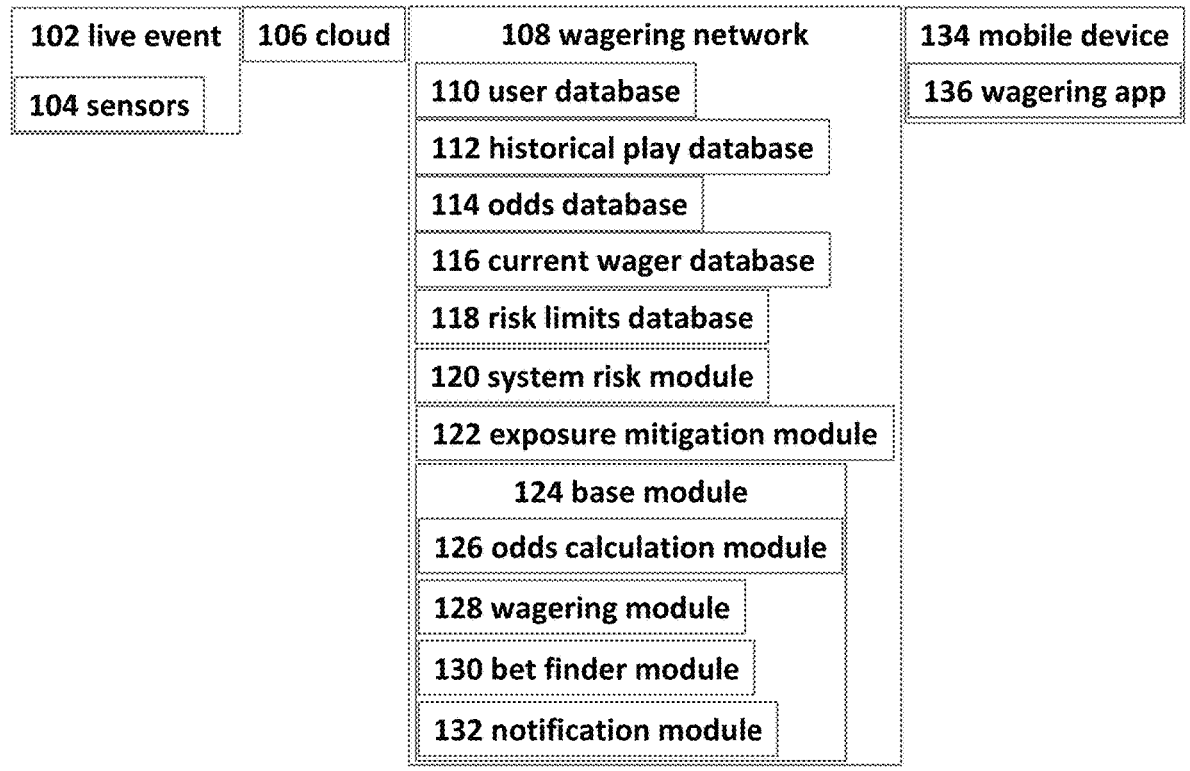
Fig. 1 Content - High Level Diagram
| Risk Score | Timestamp |
|---|---|
| 100 | 3:10:56:595 PM 11/2/2020. |
| 100 | 3:10:56:596 PM 11/2/2020. |
| 101 | 3:10:56:597 PM 11/2/2020. |
| - | - |
| - | - |
Fig. 2 risk limits database Data Content

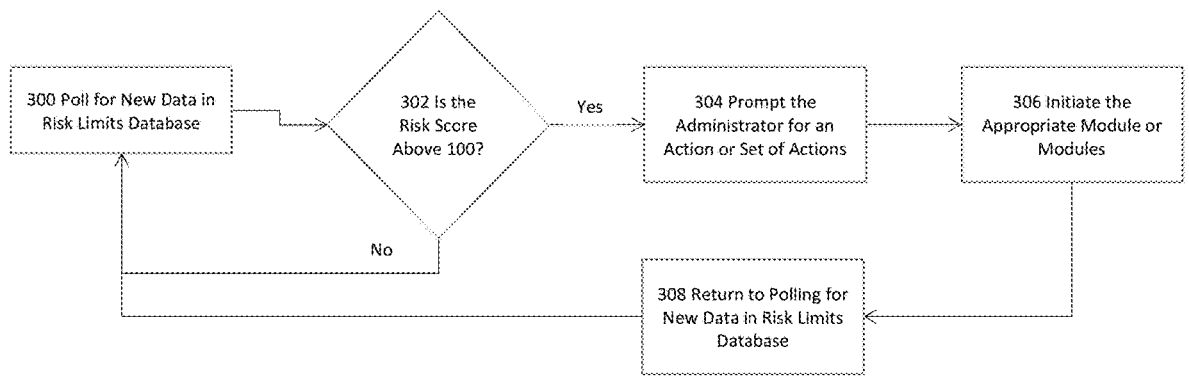
Fig. 3 system risk module Object Content
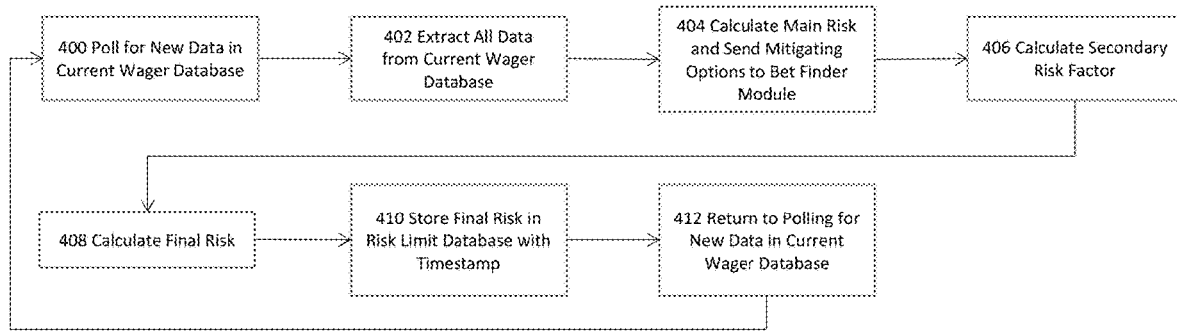
Fig. 4 exposure mitigation module Object Content
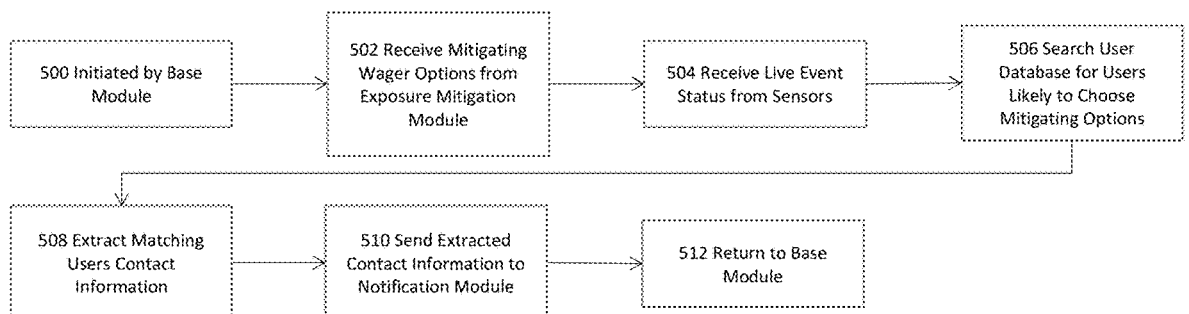
Fig. 5 bet finder module Object Content

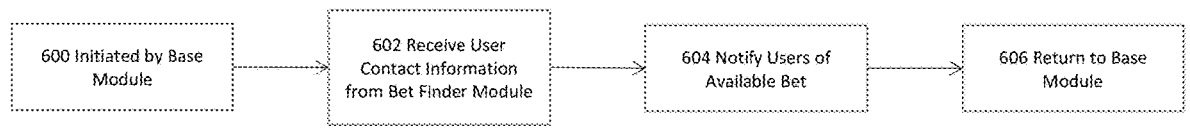
Fig. 6 notification module Object Content

METHOD OF DISPLAYING A NOTIFICATION FROM A BETTING APPLICATION USING AI THAT CAN IMPACT NORMAL BETTING

FIELD

The embodiments are generally related to play by play wagering on live sporting events

BACKGROUND

When a wager with fixed odds is offered to a large enough number of people, the offeror of the wager is becoming insulated from risk when the losses from one outcome are offset by the winnings of another outcome. By adjusting the odds such that the offeror of the bet comes out slightly ahead regardless of outcome, over time the offeror of wagers becomes profitable. However, if a disproportionate amount of people place wagers on one outcome over the other options, the offeror of the wager will be at risk if that outcome occurs.

To remedy this issue, offerors of wagers often have to adjust odds in order to incentivize people to bet on the less popular wager options, cap the number of people who can select a wager option, change from a fixed odds system to a para-mutuel or betting pool system, or disincentivize users from continuing to bet on the popular option by reducing the payout. All of these options have their own drawbacks which offerors of wagers may seek to avoid.

BRIEF DESCRIPTIONS OF THE DRAWINGS

The accompanying drawings illustrate various embodiments of systems, methods, and various other aspects of the embodiments. Any person with ordinary skills in the art will appreciate that the illustrated element boundaries (e.g. boxes, groups of boxes, or other shapes) in the figures represent an example of the boundaries. It may be understood that, in some examples, one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles.

FIG. 1 illustrates a method of displaying a notification from a betting application using AI that can impact normal betting, according to an embodiment.

FIG. 2 illustrates a risk limits database, according to an embodiment.

FIG. 3 illustrates a system risk module, according to an embodiment.

FIG. 4 illustrates an exposure mitigation module, according to an embodiment.

FIG. 5 illustrates a bet finder module, according to an embodiment.

FIG. 6 illustrates a notification module, according to an embodiment.

DETAILED DESCRIPTION

Aspects of the present invention are disclosed in the following description and related figures directed to specific embodiments of the invention. Those of ordinary skill in the art will recognize that alternate embodiments may be devised without departing from the spirit or the scope of the claims. Additionally, well-known elements of exemplary embodiments of the invention will not be described in detail or will be omitted so as not to obscure the relevant details of the invention.

As used herein, the word exemplary means serving as an example, instance or illustration. The embodiments described herein are not limiting, but rather are exemplary only. It should be understood that the described embodiments are not necessarily to be construed as preferred or advantageous over other embodiments. Moreover, the terms embodiments of the invention, embodiments or invention do not require that all embodiments of the invention include the discussed feature, advantage, or mode of operation.

Further, many of the embodiments described herein are described in terms of sequences of actions to be performed by, for example, elements of a computing device. It should be recognized by those skilled in the art that the various sequence of actions described herein can be performed by specific circuits (e.g., application specific integrated circuits (ASICs)) and/or by program instructions executed by at least one processor. Additionally, the sequence of actions described herein can be embodied entirely within any form of computer-readable storage medium such that execution of the sequence of actions enables the processor to perform the functionality described herein. Thus, the various aspects of the present invention may be embodied in a number of different forms, all of which have been contemplated to be within the scope of the claimed subject matter. In addition, for each of the embodiments described herein, the corresponding form of any such embodiments may be described herein as, for example, a computer configured to perform the described action.

With respect to the embodiments, a summary of terminology used herein is provided.

An action refers to a specific play or specific movement in a sporting event. For example, an action may determine which players were involved during a sporting event. In some embodiments, an action may be a throw, shot, pass, swing, kick, hit, performed by a participant in a sporting event. In some embodiments, an action may be a strategic decision made by a participant in the sporting event such as a player, coach, management, etc. In some embodiments, an action may be a penalty, foul, or type of infraction occurring in a sporting event. In some embodiments, an action may include the participants of the sporting event. In some embodiments, an action may include beginning events of sporting event, for example opening tips, coin flips, opening pitch, national anthem singers, etc. In some embodiments, a sporting event may be football, hockey, basketball, baseball, golf, tennis, soccer, cricket, rugby, MMA, boxing, swimming, skiing, snowboarding, horse racing, car racing, boat racing, cycling, wrestling, Olympic sport, eSports, etc. Actions can be integrated into the embodiments in a variety of manners.

A "bet" or "wager" is to risk something, usually a sum of money, against someone else's or an entity on the basis of the outcome of a future event, such as the results of a game or event. It may be understood that non-monetary items may be the subject of a "bet" or "wager" as well, such as points or anything else that can be quantified for a "bet" or "wager". A bettor refers to a person who bets or wagers. A bettor may also be referred to as a user, client, or participant throughout the present invention. A "bet" or "wager" could be made for obtaining or risking a coupon or some enhancements to the sporting event, such as better seats, VIP treatment, etc. A "bet" or "wager" can be done for certain amount or for a future time. A "bet" or "wager" can be done for being able to answer a question correctly. A "bet" or "wager" can be done within a certain period of time. A "bet" or "wager" can be integrated into the embodiments in a variety of manners.

A "book" or "sportsbook" refers to a physical establishment that accepts bets on the outcome of sporting events. A "book" or "sportsbook" system enables a human working with a computer to interact, according to set of both implicit and explicit rules, in an electronically powered domain for the purpose of placing bets on the outcome of sporting event. An added game refers to an event not part of the typical menu of wagering offerings, often posted as an accommodation to patrons. A "book" or "sportsbook" can be integrated into the embodiments in a variety of manners.

To "buy points" means a player pays an additional price (more money) to receive a half-point or more in the player's favor on a point spread game. Buying points means you can move a point spread, for example up to two points in your favor. "Buy points" can be integrated into the embodiments in a variety of manners.

The "price" refers to the odds or point spread of an event. To "take the price" means betting the underdog and receiving its advantage in the point spread. "Price" can be integrated into the embodiments in a variety of manners.

"No action" means a wager in which no money is lost or won, and the original bet amount is refunded. "No action" can be integrated into the embodiments in a variety of manners.

The "sides" are the two teams or individuals participating in an event: the underdog and the favorite. The term "favorite" refers to the team considered most likely to win an event or game. The "chalk" refers to a favorite, usually a heavy favorite. Bettors who like to bet big favorites are referred to "chalk eaters" (often a derogatory term). An event or game in which the sports book has reduced its betting limits, usually because of weather or the uncertain status of injured players is referred to as a "circled game." "Laying the points or price" means betting the favorite by giving up points. The term "dog" or "underdog" refers to the team perceived to be most likely to lose an event or game. A "longshot" also refers to a team perceived to be unlikely to win an event or game. "Sides", "favorite", "chalk", "circled game", "laying the points price", "dog" and "underdog" can be integrated into the embodiments in a variety of manners.

The "money line" refers to the odds expressed in terms of money. With money odds, whenever there is a minus (−) the player "lays" or is "laying" that amount to win (for example $100); where there is a plus (+) the player wins that amount for every $100 wagered. A "straight bet" refers to an individual wager on a game or event that will be determined by a point spread or money line. The term "straight-up" means winning the game without any regard to the "point spread"; a "money-line" bet. "Money line", "straight bet", "straight-up" can be integrated into the embodiments in a variety of manners.

The "line" refers to the current odds or point spread on a particular event or game. The "point spread" refers to the margin of points in which the favored team must win an event by to "cover the spread." To "cover" means winning by more than the "point spread". A handicap of the "point spread" value is given to the favorite team so bettors can choose sides at equal odds. "Cover the spread" means that a favorite win an event with the handicap considered or the underdog wins with additional points. To "push" refers to when the event or game ends with no winner or loser for wagering purposes, a tie for wagering purposes. A "tie" is a wager in which no money is lost or won because the teams' scores were equal to the number of points in the given "point spread". The "opening line" means the earliest line posted for a particular sporting event or game. The term "pick" or "pick'em" refers to a game when neither team is favored in an event or game. "Line", "cover the spread", "cover", "tie", "pick" and "pick-em" can be integrated into the embodiments in a variety of manners.

To "middle" means to win both sides of a game; wagering on the "underdog" at one point spread and the favorite at a different point spread and winning both sides. For example, if the player bets the underdog +4½ and the favorite −3½ and the favorite wins by 4, the player has middled the book and won both bets. "Middle" can be integrated into the embodiments in a variety of manners.

Digital gaming refers to any type of electronic environment that can be controlled or manipulated by a human user for entertainment purposes. A system that enables a human and a computer to interact according to set of both implicit and explicit rules, in an electronically powered domain for the purpose of recreation or instruction. "eSports" refers to a form of sports competition using video games, or a multiplayer video game played competitively for spectators, typically by professional gamers. Digital gaming and "eSports" can be integrated into the embodiments in a variety of manners.

The term event refers to a form of play, sport, contest, or game, especially one played according to rules and decided by skill, strength, or luck. In some embodiments, an event may be football, hockey, basketball, baseball, golf, tennis, soccer, cricket, rugby, MMA, boxing, swimming, skiing, snowboarding, horse racing, car racing, boat racing, cycling, wrestling, Olympic sport, etc. Event can be integrated into the embodiments in a variety of manners.

The "total" is the combined number of runs, points or goals scored by both teams during the game, including overtime. The "over" refers to a sports bet in which the player wagers that the combined point total of two teams will be more than a specified total. The "under" refers to bets that the total points scored by two teams will be less than a certain figure. "Total", "over", and "under" can be integrated into the embodiments in a variety of manners.

A "parlay" is a single bet that links together two or more wagers; to win the bet, the player must win all the wagers in the "parlay". If the player loses one wager, the player loses the entire bet. However, if he wins all the wagers in the "parlay", the player wins a higher payoff than if the player had placed the bets separately. A "round robin" is a series of parlays. A "teaser" is a type of parlay in which the point spread, or total of each individual play is adjusted. The price of moving the point spread (teasing) is lower payoff odds on winning wagers. "Parlay", "round robin", "teaser" can be integrated into the embodiments in a variety of manners.

A "prop bet" or "proposition bet" means a bet that focuses on the outcome of events within a given game. Props are often offered on marquee games of great interest. These include Sunday and Monday night pro football games, various high-profile college football games, major college bowl games and playoff and championship games. An example of a prop bet is "Which team will score the first touchdown?" "Prop bet" or "proposition bet" can be integrated into the embodiments in a variety of manners.

A "first-half bet" refers to a bet placed on the score in the first half of the event only and only considers the first half of the game or event. The process in which you go about placing this bet is the same process that you would use to place a full game bet, but as previously mentioned, only the first half is important to a first-half bet type of wager. A "half-time bet" refers to a bet placed on scoring in the second half of a game or event only. "First-half-bet" and "half-time-bet" can be integrated into the embodiments in a variety of manners.

A "futures bet" or "future" refers to the odds that are posted well in advance on the winner of major events, typical future bets are the Pro Football Championship, Collegiate Football Championship, the Pro Basketball Championship, the Collegiate Basketball Championship, and the Pro Baseball Championship. "Futures bet" or "future" can be integrated into the embodiments in a variety of manners.

The "listed pitchers" is specific to a baseball bet placed only if both of the pitchers scheduled to start a game actually start. If they don't, the bet is deemed "no action" and refunded. The "run line" in baseball, refers to a spread used instead of the money line. "Listed pitchers" and "no action" and "run line" can be integrated into the embodiments in a variety of manners.

The term "handle" refers to the total amount of bets taken. The term "hold" refers to the percentage the house wins. The term "juice" refers to the bookmaker's commission, most commonly the 11 to 10 bettors lay on straight point spread wagers: also known as "vigorish" or "vig". The "limit" refers to the maximum amount accepted by the house before the odds and/or point spread are changed. "Off the board" refers to a game in which no bets are being accepted. "Handle", "juice", vigorish", "vig" and "off the board" can be integrated into the embodiments in a variety of manners.

"Casinos" are a public room or building where gambling games are played. "Racino" is a building complex or grounds having a racetrack and gambling facilities for playing slot machines, blackjack, roulette, etc. "Casino" and "Racino" can be integrated into the embodiments in a variety of manners.

Customers are companies, organizations or individual that would deploy, for fees, and may be part of, or perform, various system elements or method steps in the embodiments.

Managed service user interface service is a service that can help customers (1) manage third parties, (2) develop the web, (3) do data analytics, (4) connect thru application program interfaces and (4) track and report on player behaviors. A managed service user interface can be integrated into the embodiments in a variety of manners.

Managed service risk management services are services that assists customers with (1) very important person management, (2) business intelligence, and (3) reporting. These managed service risk management services can be integrated into the embodiments in a variety of manners.

Managed service compliance service is a service that helps customers manage (1) integrity monitoring, (2) play safety, (3) responsible gambling and (4) customer service assistance. These managed service compliance services can be integrated into the embodiments in a variety of manners.

Managed service pricing and trading service is a service that helps customers with (1) official data feeds, (2) data visualization and (3) land based, on property digital signage. These managed service pricing and trading services can be integrated into the embodiments in a variety of manners.

Managed service and technology platform are services that helps customers with (1) web hosting, (2) IT support and (3) player account platform support. These managed service and technology platform services can be integrated into the embodiments in a variety of manners.

Managed service and marketing support services are services that help customers (1) acquire and retain clients and users, (2) provide for bonusing options and (3) develop press release content generation. These managed service and marketing support services can be integrated into the embodiments in a variety of manners.

Payment processing services are those services that help customers that allow for (1) account auditing and (2) withdrawal processing to meet standards for speed and accuracy. Further, these services can provide for integration of global and local payment methods. These payment processing services can be integrated into the embodiments in a variety of manners.

Engaging promotions allow customers to treat your players to free bets, odds boosts, enhanced access and flexible cashback to boost lifetime value. Engaging promotions can be integrated into the embodiments in a variety of manners.

"Cash out" or "pay out" or "payout" allow customers to make available, on singles bets or accumulated bets with a partial cash out where each operator can control payouts by managing commission and availability at all times. The "cash out" or "pay out" or "payout" can be integrated into the embodiments in a variety of manners, including both monetary and non-monetary payouts, such as points, prizes, promotional or discount codes, and the like.

"Customized betting" allow customers to have tailored personalized betting experiences with sophisticated tracking and analysis of players' behavior. "Customized betting" can be integrated into the embodiments in a variety of manners.

Kiosks are devices that offer interactions with customers clients and users with a wide range of modular solutions for both retail and online sports gaming. Kiosks can be integrated into the embodiments in a variety of manners.

Business Applications are an integrated suite of tools for customers to manage the everyday activities that drive sales, profit, and growth, by creating and delivering actionable insights on performance to help customers to manage the sports gaming. Business Applications can be integrated into the embodiments in a variety of manners.

State based integration allows for a given sports gambling game to be modified by states in the United States or other countries, based upon the state the player is in, based upon mobile phone or other geolocation identification means. State based integration can be integrated into the embodiments in a variety of manners.

Game Configurator allow for configuration of customer operators to have the opportunity to apply various chosen or newly created business rules on the game as well as to parametrize risk management. Game configurator can be integrated into the embodiments in a variety of manners.

"Fantasy sports connector" are software connectors between method steps or system elements in the embodiments that can integrate fantasy sports. Fantasy sports allow a competition in which participants select imaginary teams from among the players in a league and score points according to the actual performance of their players. For example, if a player in a fantasy sports is playing at a given real time sports, odds could be changed in the real time sports for that player.

Software as a service (or SaaS) is a method of software delivery and licensing in which software is accessed online via a subscription, rather than bought and installed on individual computers. Software as a service can be integrated into the embodiments in a variety of manners.

Synchronization of screens means synchronizing bets and results between devices, such as TV and mobile, PC and wearables. Synchronization of screens can be integrated into the embodiments in a variety of manners.

Automatic content recognition (ACR) is an identification technology to recognize content played on a media device or present in a media file. Devices containing ACR support enable users to quickly obtain additional information about the content they see without any user-based input or search efforts. To start the recognition, a short media clip (audio, video, or both) is selected. This clip could be selected from within a media file or recorded by a device. Through algorithms such as fingerprinting, information from the actual perceptual content is taken and compared to a database of reference fingerprints, each reference fingerprint corresponding to a known recorded work. A database may contain metadata about the work and associated information, including complementary media. If the fingerprint of the media clip is matched, the identification software returns the corresponding metadata to the client application. For example, during an in-play sports game a "fumble" could be recognized and at the time stamp of the event, metadata such as "fumble" could be displayed. Automatic content recognition (ACR) can be integrated into the embodiments in a variety of manners.

Joining social media means connecting an in-play sports game bet or result to a social media connection, such as a FACEBOOK® chat interaction. Joining social media can be integrated into the embodiments in a variety of manners.

Augmented reality means a technology that superimposes a computer-generated image on a user's view of the real world, thus providing a composite view. In an example of this invention, a real time view of the game can be seen and a "bet" which is a computer-generated data point is placed above the player that is bet on. Augmented reality can be integrated into the embodiments in a variety of manners.

Some embodiments of this disclosure, illustrating all its features, will now be discussed in detail. It can be understood that the embodiments are intended to be open ended in that an item or items used in the embodiments is not meant to be an exhaustive listing of such item or items, or meant to be limited to only the listed item or items.

It can be noted that as used herein and in the appended claims, the singular forms "a," "an," and "the" include plural references unless the context clearly dictates otherwise. Although any systems and methods similar or equivalent to those described herein can be used in the practice or testing of embodiments, only some exemplary systems and methods are now described.

FIG. 1 is a system for a method of displaying a notification from a betting application using AI that can impact normal betting. This system is comprised of a live event 102, for example a sporting event such as a football game, basketball game, baseball game, hockey game, tennis match, golf tournament, eSports or digital game, etc. The live event 102 will include some number of actions or plays, upon which a user or bettor or customer can place a bet or wager, typically through an entity called a sportsbook. There are numerous types of wagers the bettor can make, including, a straight bet, a money line bet, a bet with a point spread or line that bettor's team would need to cover, if the result of the game was the same as the point spread the user would not cover the spread, but instead the tie is called a push. If the user is betting on the favorite, they are giving points to the opposing side, which is the underdog or longshot. Betting on all favorites is referred to as chalk, this is typically applied to round robin, or other styles of tournaments. There are other types of wagers, including parlays, teasers, and prop bets, that are added games, that often allow the user to customize their betting, by changing the odds and payouts they receive on a wager. Certain sportsbooks will allow the bettor to buy points, to move the point spread off of the opening line, this will increase the price of the bet, sometimes by increasing the juice, vig, or hold that the sportsbook takes. Another type of wager the bettor can make is an over/under, in which the user bets over or under a total for the live event, such as the score of American football or the run line in baseball, or a series of action in the live event 102. Sportsbooks have a number of bets they can handle, a limit of wagers they can take on either side of a bet before they will move the line or odds off of the opening line. Additionally, there are circumstance, such as an injury to an important player such as a listed pitcher, in which a sportsbook, casino or racino will take an available wager off the board. As the line moves there becomes an opportunity for a bettor to bet on both sides at different point spreads in order to middle and win both bets. Sportsbooks will often offer bets on portions of games, such as first half bets and half-time bets. Additionally, the sportsbook can offer futures bets on live events 102 in the future. Sportsbooks need to offer payment processing services in order to cash out customers. This can be done at kiosks at the live event 102 or at another location.

Further, embodiments may include a plurality of sensors 104 that may be used such as motion sensors, temperature sensors, humidity sensors, cameras such as an RGB-D Camera which is a digital camera capturing color (RGB) and depth information for every pixel in an image, microphones, a radiofrequency receiver, a thermal imager, a radar device, a lidar device, an ultrasound device, a speaker, wearable devices etc. Also, the plurality of sensors 104 may include tracking devices, such as RFID tags, GPS chips or other such devices embedded on uniforms, in equipment, in the field of play, in the boundaries of the field of play, or other markers on the field of play. Imaging devices may also be used as tracking devices such as player tracking that captures statistical information through real-time X, Y positioning of players and X, Y, Z positioning of the ball.

Further, embodiments may include a cloud 106 or communication network which may be a wired and/or a wireless network. The communication network, if wireless, may be implemented using communication techniques such as Visible Light Communication (VLC), Worldwide Interoperability for Microwave Access (WiMAX), Long Term Evolution (LTE), Wireless Local Area Network (WLAN), Infrared (IR) communication, Public Switched Telephone Network (PSTN), Radio waves, and other communication techniques known in the art. The communication network may allow ubiquitous access to shared pools of configurable system resources and higher-level services that can be rapidly provisioned with minimal management effort, which may occur over Internet and relies on sharing of resources to achieve coherence and economies of scale, like a public utility, while third-party clouds enable organizations to focus on their core businesses instead of expending resources on computer infrastructure and maintenance. The cloud 106 may be communicatively coupled to a wagering network 108 which may perform real time analysis on the type of play and the result of the play. The cloud 106 may also be synchronized with game situational data, such as the time of the game, the score, location on the field, weather conditions, and the like which may affect the choice of play utilized. For example, in some exemplary embodiments, the cloud 106 may not receive data gathered from the plurality of sensors 104 and may, instead, receive data from an alternative data feed, such as SportsRadar®. This data may be provided substantially immediately following the completion of any play and the data from this feed may be compared with a variety of team data and league data based on a variety of elements, including down, possession, score, time, team, and so forth, as described in various exemplary embodiments herein.

Further, embodiments may include the wagering network 108 which may perform real time analysis on the type of play and the result of a play or action. The wagering network 108 (or cloud 106) may also be synchronized with game situational data, such as the time of the game, the score, location on the field, weather conditions, and the like which may affect the choice of play utilized. For example, in some exemplary embodiments, a wagering network 108 may not receive data gathered from the plurality of sensors 104 and may, instead, receive data from an alternative data feed, such as SportsRadar®. This data may be provided substantially immediately following the completion of any play and the data from this feed may be compared with a variety of team data and league data based on a variety of elements, including down, possession, score, time, team, and so forth, as described in various exemplary embodiments herein. The wagering network 108 may offer a number of software as a service managed services such as, but not limited to, user interface service, risk management service, compliance, pricing and trading service, IT support of the technology platform, business applications, game configuration, state based integration, fantasy sports connection, integration to allow the joining of social media, and marketing support services that can deliver engaging promotions to the user.

Further, embodiments may utilize a user database 110 which contains data relevant to all users of the system, which may include, a user ID, a device identifier, a paired device identifier, wagering history, and wallet information for each user.

Further, embodiments may include a historical play database 112 which contains play data for the type of sport being played in the live event 102. For example, in American Football, for optimal odds calculation, the historical play data may include meta data about the historical plays, such as time, location, weather, previous plays, opponent, physiological data, etc.

Further, embodiments may utilize an odds database 114 that contains the odds calculated by an odds calculation module 126, and the multipliers for distance and path deviation, and is used for reference by a wagering module 128 and to take bets from the user through a user interface and calculate the payouts to the user.

Further, embodiments may utilize a current wager database 116 that contains a running tally of all open wagers so the system can calculate its current exposure level on each potential outcome of the coming play.

Further, embodiments may utilize a risk limits database 118 that stores risks on wagers calculated by an exposure mitigation module 122.

Further, embodiments may utilize a system risk module 120 that alerts an administrator when the risk exposure of a play is too high. This gives the administrator a real time response to send an alert which might stop further bets in order to limit exposure before all bets are in.

Further, embodiments may utilize the exposure mitigation module 122 that polls the current wager database 116 for new data events (e.g. a new wager) and then calculates risk exposure on that outcome. The main focus of this module is imbalance of wagers on a play, in other embodiments the exposure mitigation module 122 may account for other types of risk such as player injury, drastic weather change, or equipment failure.

Further, embodiments may utilize a base module 124 that initiates the odds calculation module 126, the wagering module 128, a bet finder module 130, and a notification module 132.

Further, embodiments may include the odds calculation module 126 which utilizes historical play data to calculate odds for in-play wagers.

Further, embodiments may include the wagering module 128 which displays bet options to users and allows them to make a wager selection and wager an amount of money or credit.

Further, embodiments may include the bet finder module 130 which first receives the level of risk calculated by the exposure mitigation module 122 and based on the level of risk finds users who based on historical data tend to make bets that would offset the risk.

Further, embodiments may include the notification module 132 which notifies users found by the bet finder module 130 that a wager is available and encourages them to place a wager.

Further, embodiments may include a mobile device 134 such as a computing device, laptop, smartphone, tablet, computer, smart speaker, or I/O devices. I/O devices may be present in the computing device. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers. Devices may include a combination of multiple input or output devices, including, e.g., Microsoft KINECT, Nintendo Wii mote for the WIT, Nintendo WIT U GAMEPAD, or Apple IPHONE. Some devices allow gesture recognition inputs through combining some of the inputs and outputs. Some devices allow for facial recognition which may be utilized as an input for different purposes including authentication and other commands. Some devices allow for voice recognition and inputs, including, e.g., Microsoft KINECT, SIRI for IPHONE by Apple, Google Now or Google Voice Search. Additional user devices have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices, display devices or group of devices may be augmented reality devices. The I/O devices may be controlled by an I/O controller. The I/O controller may control one or more I/O devices, such as, e.g., a keyboard and a pointing device, e.g., a mouse or optical pen. Furthermore, an I/O device may also contain storage and/or an installation medium for the computing device. In still other embodiments, the computing device may include USB connections (not shown) to receive handheld USB storage devices. In further embodiments, an I/O device may be a bridge between the system bus and an external communication bus, e.g. a USB bus, a SCSI bus, a FireWire bus, an Ethernet bus, a Gigabit Ethernet bus, a Fiber Channel bus, or a Thunderbolt bus. In some embodiments the mobile device 134 could be an optional component and would be utilized in a situation in which a paired wearable device is utilizing the mobile device 134 as additional memory or computing power or connection to the internet.

Further, embodiments may include a wagering app 136, which is a program that enables the user to place bets on individual plays in the live event 102, and display the audio and video from the live event 102, along with the available wagers on the mobile device 134. The wagering app 136 allows the user to interact with the wagering network 108 in order to place bets and provide payment/receive funds based on wager outcomes.

FIG. 2 illustrates the risk limits database 118. The risk limits database 118 contains risks on wagers calculated by the exposure mitigation module 122. The risk is stored as a whole number or risk score, for example 100, and each stored risk has a time stamp of when it was calculated, for example, 3:10:56:595 PM Nov. 2, 2020. In some embodiments the accuracy of the timestamp may be dependent on the speed at which the exposure mitigation module 122 updates. In some embodiments the risk limits database 118 may contain additional identifiers to differentiate between different plays, games, wager options, etc.

FIG. 3 illustrates the system risk module 120. The process begins with the system risk module 120 polling, at step 300, for new data in the risk limits database 118. The system risk module 120 determines, at step 302, if the risk score of the new data is above 100. In other embodiments the threshold may be different than 100 and may be set by the administrator, a third party, or another module and may be static or dynamic. The system risk module 120 prompts, at step 304, the administrator for an action or set of actions to take; for example, the administrator may choose to close the betting window, change the odds, incentivize users to bet on options that would reduce the risk score, or any combination of those actions. In an embodiment a GUI may facilitate this selection of actions. The system risk module 120 initiates, at step 306, the module or modules corresponding to the action or actions selected by the administrator. For example, if the administrator selected to adjust the odds the system risk module 120 may initiate an "odds adjustment module". In some cases, the system risk module 120 may not initiate modules directly but may indicate to another module, for example the base module 124, which modules should be initiated. The system risk module 120 returns, at step 308, to polling for new data from the risk limits database 118. In some embodiments the system risk module 120 may wait for some amount of time before returning to polling for new data from the risk limits database 118 in order to give the actions taken by the administrator time to take effect before checking if there is still a risk score above threshold.

FIG. 4 illustrates the exposure mitigation module 122. The process begins with the exposure mitigation module 122 polling, at step 400, for new data in the current wager database 116. The exposure mitigation module 122 extracts, at step 402, all data from the current wager database 116. The exposure mitigation module 122 calculates, at step 404, a main risk based on the imbalance between selected wager options. Normally odds are calculated in such a way that despite the outcome of the play there is always enough money lost by users to pay off the money won by users. However, in cases where an unexpected number of users select one wager option, the offeror of the wager risks taking a loss. For example, in a simple play where there is only one possible result, two betting options "run" or "pass", and the odds for each option are 2 to 1, then there is no risk if exactly half of all money is bet on each option, since the losses from the losing half will pay for the winnings of the winning half. However, if one additional dollar is wagered on "run" than "pass" then the bet offeror stands to lose money if the result of the play is a pass. To calculate risk for this example the exposure mitigation module 122 could determine the amount of gain if a run occurs minus the amount of loss if a run occurs, and similarly for if a pass occurred. In this example only a run would result in a loss to the offeror of the bet, so the amount of loss would be multiplied by the likelihood of the outcome occurring to determine the risk, in this example the risk would be $1 multiplied by 50% (note that the internal odds of an outcome and the odds given to bettors may differ because the offeror of the bet usually earns money by slightly reducing the odds), and the risk would be $0.50. This 0.50 is the risk score for the main risk for the wager. In more complex wagers where there may be more than one result that causes a risk of loss, the risk will be the highest risk score among those results, in other embodiments the risk scores may be combined, for example, by taking an average. In some embodiments risk score could be created by a previously defined rule or could be developed by looking at past historical rates and amounts of the particular bets or groups of bets or all bets, using AI, to enhance the exposure risk. The wager options that do not contribute to the main risk are mitigating options, meaning users betting on these options would reduce the main risk. The exposure mitigation module 122 sends these options to the bet finder module 130. The exposure mitigation module 122 calculates, at step 406, a secondary risk factor based on known risks which would not have been accounted for in the original odds calculation. The exposure mitigation module 122 determines from any known data about the play, if there is for example, (1) a past or current injury to a player key to the event in play, (2) drastic weather changes in a sporting event, or (3) star player equipment failure, this module searches through the wager history database, using AI, for any of these secondary risks. For instance, a key player's results were considerably reduced for 1-2 days after an injury and this was highly correlated. If this was found, a weighting factor is returned to be used to modify the main risk. The secondary risk factor is calculated from the historical play data based on the amount that the secondary risk contributed to an outcome that would result in a loss based on the main risk. For example, a wrist injury to the quarterback of a football game may often result in an increase in runs over passes. If the offeror of the bet stands to lose money on a run, then the risk factor would reflect the increased amount of plays that will result in runs. If runs are 20% more common when the quarterback of a football game has an injured wrist, then the secondary risk factor would be 1.2. In some embodiments, the secondary risk factor may be retrieved from a database of known risks, for example, if a player is injured, the exposure mitigation module 122 may look up "player injury" in a database and may find an associated risk factor of 1.2. The exposure mitigation module 122 calculates, at step 408, the final risk score by multiplying the main risk by the secondary risk factor. In some embodiments there may be more than one secondary risk factor in which case the final risk may be calculated by multiplying the main risk by all secondary risk factors or by the largest secondary risk factor. The exposure mitigation module 122 stores, at step 410, the final risk score in the risk limits database 118 with a timestamp. The exposure mitigation module 122 returns, at step 412, to polling for new data in the current wager database 116.

FIG. 5 illustrates the bet finder module 130. The process begins with the bet finder module 130 being, at step 500, initiated by the base module 124. The bet finder module 130 receives, at step 502, mitigating wager options sent by the exposure mitigation module 122. The bet finder module 130 receives, at step 504, data on the status of the live event 102 from the plurality of sensors 104. For example the bet finder module 130 may receive data that identifies the live event 102 as a football game between the Los Angeles Chargers and the Denver Broncos, wherein the Broncos are on offense, it is 3rd and 10 and 3 minutes into the 4th quarter, and the weather is fair. The bet finder module 130 searches, at step 506, for users likely to choose the mitigating wager options. The bet finder module 130 looks for users with a history of betting for the mitigating wager options more often than average and may use filters to narrow down the search closer to the current state of the live game. For example, based on the data from the plurality of sensors 104 the live event 102 is a football game between the Los Angeles Chargers and the Denver Broncos, wherein the Broncos are on offense, it is 3rd and 10 and 3 minutes into the 4th quarter, and the weather is fair. Two wager options are available to users, "run" or "pass", and an unexpected number of users have selected "run". The exposure mitigation module 122 has determined that there is a risk of loss because of the imbalance between the two wager options and has sent the wager option "pass" to the bet finder module 130 as a mitigating wager option. The bet finder module 130 searches the user database for users who often, or at least more often than average, choose the wager option pass when the Broncos are playing against the Chargers, the Broncos are on offense, it is 3rd and 10 and 3 minutes into the 4th quarter, and the weather is fair. In some embodiments not every filter must match the exact state of the live game 102, for example, wagers made by users when the Broncos were not playing the Chargers or when it is 3rd and 9 instead of 3rd and 10 may be included. In some embodiments the amount and strictness of the filters may be based on the amount of users needed to mitigate risk, for example, if an estimated 1000 users are needed to bet on the mitigating option, the bet finder module 130 may find 1000 users, starting with those with bets made that most closely match the state of the live game 102 then reducing the threshold requirements to be considered similar until 1000 users are found. In some embodiments an artificial intelligence algorithm will determine which parameters are correlated with the chosen bet options and filter the search based on only the parameters that significantly affect wager selection. The bet finder module 130 extracts, at step 508, the contact information of the matching users. Contact information refers to any method by which the user can be notified of an available wager for example, an email, phone number, or an identifier such as a username by which the user can be sent a notification via the wagering app 136. The bet finder module 130 sends, at step 510, the extracted contact information for each user to the notification module 132. The bet finder module 130 returns, at step 512, to the base module 124.

FIG. 6 illustrates the notification module 132. The process begins with the notification module 132 being, at step 600, initiated by the base module 124. The notification module 132 receives, at step 602, user contact information from the bet finder module 130. The notification nodule 132 notifies, at step 604, each user of the available wager. For example, user John Smith is identified by the bet finder module 130 as a user who often bets on "pass" which is a mitigating wager option. The notification module 132 sends John Smith a message based on his contact information, since his contact information is a phone number the notification module 132 sends the message via SMS text. The message informs John Smith that there is a wager available with text that reads "A wager is available that we think you would like!". In some embodiments the notification module may contain a link which opens up the wagering app 136 if not already open, or may open to a wager associated with or referred to in the notification. In some embodiments the notification may contain incentives such as discounts, increased odds, free credit, etc. especially if the user chooses the mitigating wager option. The notification module 132 returns, at step 606, to the base module 124.

What is claimed is:

1. A system for providing wagers in a wagering system, comprising:
   a wagering application having an interface;
   a user database including a wager history database configured to store aggregated historical wagering activity for users of the wagering application including at least a plurality of users, a plurality of trends being present in the aggregated historical wagering activity, and
   an exposure mitigation module that is configured to:
      extract data from a current wager database,
      calculate a main risk based upon the extracted data,
      determine a plurality of mitigating wager options by using artificial intelligence (AI) to search through the wager history database, identify one or more of the plurality of trends and a time period over which the one or more trends are observed, and map the one or more of the plurality of trends to one or more secondary risks, and
      update wagering options available to the plurality of users, and cause a plurality of interfaces of the plurality of users to be updated by transmitting one or more of the plurality of mitigating wager options over a wagering network to the plurality of users, the plurality of users identified based on wager history, in response to a mathematical combination of the main risk and determined mitigating wager options on the wagering application interface.

2. The system for providing wagers in the wagering system of claim 1, further comprising:
   a bet finder module that is configured to identify the plurality of users with wagering preferences associated with the mitigating wager options.

3. A system for providing wagers in a wagering system, comprising:
   a wagering application having an interface;
   a user database including a wager history database configured to store aggregated historical wagering activity for users of the wagering application including at least a plurality of users, a plurality of trends being present in the aggregated historical wagering activity,
   an exposure mitigation module that is configured to
   extract data from a current wager database,
   calculate a main risk based upon the extracted data, determine one or more mitigating wager options that offset the main risk by using artificial intelligence (AI) to search through the wager history database, identify one or more of the plurality of trends and a time period over which the one or more trends are observed, and map the one or more of the plurality of trends to one or more secondary risks, and output mitigating wager options in response to a final risk on the wagering application interface, and update wagering options available to the plurality of users based on the output;

a notification module that is configured to cause one or more interfaces of the plurality of users to be updated by transmitting the mitigating wager options to one or more users in the plurality of users on a wagering network; and a bet finder module that is configured to identify the one or more users with wagering preferences or histories associated with the wager mitigation options.

* * * * *